United States Patent [19]
Gobler et al.

[11] 3,913,881
[45] Oct. 21, 1975

[54] WELD PLATE ASSEMBLY POSITIONING APPARATUS

[75] Inventors: Harry W. Gobler, Santa Rosa, Calif.; Robert Grotheer, Cincinnati, Ohio

[73] Assignee: Ecodyne Corporation, Lincolnshire, Ill.

[22] Filed: Apr. 15, 1974

[21] Appl. No.: 461,038

Related U.S. Application Data

[62] Division of Ser. No. 273,065, July 10, 1972, abandoned.

[52] U.S. Cl. ................. 249/83; 249/13; 249/93; 264/259; 264/277; 264/278
[51] Int. Cl.² ........................................... B28B 7/22
[58] Field of Search ............... 249/13, 83, 91, 93; 264/259, 275, 277, 278, 279; 425/117, 125

[56] References Cited
UNITED STATES PATENTS

| | | |
|---|---|---|
| 2,094,538 | 9/1937 | Ingersoll .............................. 249/93 |
| 2,489,851 | 11/1949 | Bean ................................. 249/83 X |
| 2,705,344 | 4/1955 | Salomone et al. ..................... 249/93 |
| 2,732,607 | 1/1956 | Dodd ............................. 264/277 X |
| 3,187,694 | 6/1965 | Crookston et al. ................ 249/83 X |
| 3,257,700 | 6/1966 | Thomas, Sr. ...................... 249/83 X |

*Primary Examiner*—Robert L. Spicer, Jr.
*Attorney, Agent, or Firm*—Joel E. Siegel; Charles M. Kaplan

[57] ABSTRACT

A method and apparatus for positioning weld plate and anchoring rod assemblies during the pouring of precast concrete structural members. The invention provides a hinged connecting plate at the side of the form. The connecting plate has an outer end, pivotal about a horizontal axis, and an inner end, having a down position immediately above the weld plate assembly location and an up position exterior of the form. The weld plate assembly is releasably secured to the inner end of the connecting plate.

5 Claims, 2 Drawing Figures

WELD PLATE ASSEMBLY POSITIONING APPARATUS

This is a division of application Ser. No. 273,065, filed July 10, 1972, now abandoned.

BACKGROUND AND SUMMARY OF THE INVENTION

The present invention relates to a method and apparatus for positioning weld plate and anchoring rod assemblies during the pouring of precast concrete structural members.

It has been the heretofore practice by local precast concrete yards, in casting concrete structural members which have weld plate and anchoring rod assemblies positioned therein, to individually determine the required location and to position such assemblies in the concrete poured within the form, prior to the concrete curing. This practice is not accurate, is time consuming and does not lend itself to the production of a large number of substantially identical precast members in an economical manner.

It is therefore a primary object of the present invention to provide a method and apparatus for precasting concrete structural members, which have weld plates and anchoring rod assemblies embedded therein, which is economical for the production of a large number of substantially similar members.

Another object of the invention is to provide a method and apparatus for efficiently and accurately positioning weld plate and anchoring rod assemblies within a form used to precast concrete structural members.

These and other objects are realized in accordance with the present invention by providing a hinged connecting plate at the side of the form adjacent the desired location of the weld plate assembly. The connecting plate includes an outer end, pivotal about a horizontal axis, and an inner end, having a down position immediately above the weld plate assembly location and an up position exterior of the form permitting the concrete member to be removed from the form. The weld plate assembly is releasably secured to the inner end of the connecting plate and the connecting plate is then swung into its down position. After the concrete within the form has cured, the connecting plate is swung into its up position leaving the weld plate assembly embedded within the concrete and permitting the concrete member to be removed from the form.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF A PREFERRED EMBODIMENT

Figure 1:
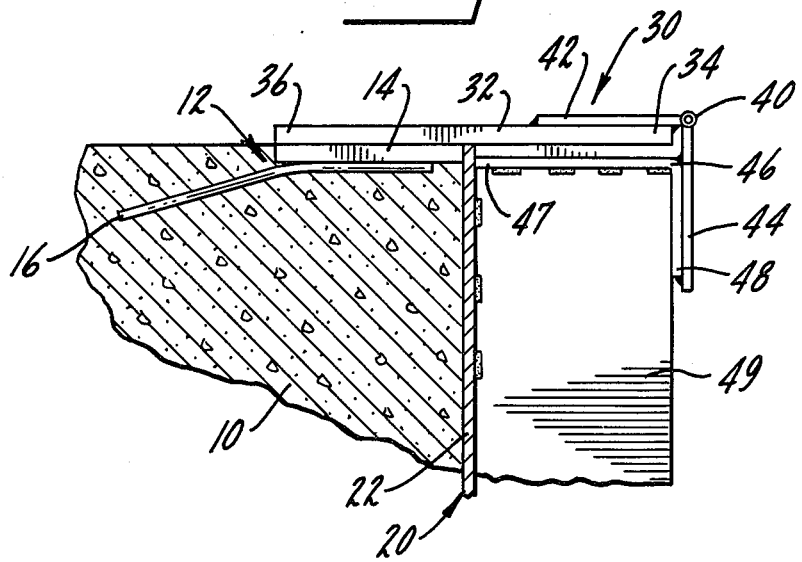
FIG. 1 is an elevation view of the apparatus of the present invention shown in conjunction with a portion of a precast concrete form.
Figure 2:
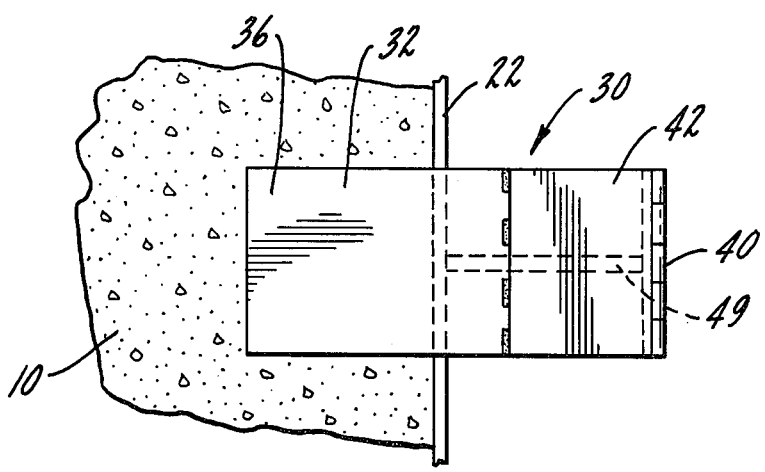
FIG. 2 is a plan view of the apparatus illustrated in FIG. 1.

FIGS. 1 and 2 illustrate a portion of a precast concrete structural member 10 having a weld plate and anchoring rod assembly 12 (hereinafter referred to as a "weld plate assembly") embedded therein. Weld plate assembly 12 includes a weld plate 14 secured to an anchoring rod 16 which extends into structural member 10. Weld plate assemblies 12 are traditionally employed as a means of securing concrete structural members together by aligning the weld plate assemblies 12 of adjacent structural members and welding the opposite ends of a connecting weld plate to each of the weld plates 14. It is therefore important that the weld plate assemblies 12 are accurately positioned within the structural members 10 to facilitate alignment of adjacent weld plates 14.

In accordance with the present invention structural member 10 is precast within a form 20 having a skin portion 22 which is conventionally designed to define the general shape of member 10. Positioned at each predetermined location around the skin portion 22 where a weld plate assembly 12 is located, is a weld plate assembly positioning apparatus 30 of the present invention.

Apparatus 30 includes a connecting plate 32 having an outer end 34 pivotally mounted about a substantially horizontal axis. The inner end 36 of connecting plate 32 is positioned relative to skin portion 22 such that when in a down position with plate 32 in contact with skin portion 22, as seen in FIG. 1, it extends immediately above the predetermined location for weld plate assembly 12 and when in an up position it is positioned exterior of a vertical extension of the confines of skin portion 22. A butt hinge assembly 40, including hinge plates 42 and 44, is spaced from the outside walls of skin portion 22 for pivoting connecting plate 32 about a substantially horizontal axis. Plate 42 is secured to outer end 34 in a suitable manner, as by welding. Securing butt hinge assembly 40 to skin portion 22 is an angle bracket 46 and a stiffener plate 49. Angle bracket 46 includes a horizontal portion 47 welded to the upper edge of stiffener plate 49 and a vertical portion 48, spaced from skin portion 22, welded to plate 44 of butt hinge assembly 40. The inner edge of stiffener plate 49 is welded to skin portion 22 adjacent the predetermined location of weld plate assembly 12.

Weld plate 14 is releasably attached to the underside of the outer end 34 of connecting plate 32, in a suitable manner. This attachment may be a menchanical connection, such as a nut and bolt arrangement passing through weld plate 14 and connecting plate 32, which is releasable from the top surface of connecting plate 32. However, an adhesive type attachment media is presently deemed preferable since it can be designed to release automatically after the concrete has cured by merely pivoting connecting plate 32 about hinge assembly 40. Adhesives of this type are well known in the art; such as double adhesive tapes and various types of glue materials.

In operation of the present invention, the skin portion 22 of form 20 is designed to define the general shape of structural member 10. Apparatus 30, in accordance with the present invention, is provided adjacent each location where a weld plate assembly 12 is to be embedded within member 10. With the connecting plates 32 of each apparatus 30 in their up positions the weld plates 14 of weld plate assemblies 12 are releasably secured to the undersides of inner ends 36. The connecting plates 32 are then swung into their down positions with the weld plate assemblies 12 positioned within the confines of skin portion 22. The concrete is poured into form 20 to a depth filling skin portion 22 and reaching the upper surface of weld plates 14. After the concrete has cured, the connecting plates 32 are swung to their up positions leaving weld plate assemblies 12 embedded with member 10. With connecting plates 32 in their up positions, member 10 may be removed from form 20 without encountering any difficulty from the apparatus 30 of the present invention.

The above disclosed preferred embodiments provide a unique method and apparatus for forming precast structural members having weld plate and anchoring rod assemblies embedded therein. These forms may be transported between local precast concrete yards, permitting the economical production of a large number of substantially similar structural members.

Various modifications are contemplated and may obviously be resorted to by those skilled in the art without departing from the spirit and scope of the invention, as hereinafter defined by the appended claims, as only preferred embodiments thereof have been disclosed.

What is claimed is:

1. Apparatus for forming a precast concrete structural member, having a weld plate and anchoring rod assembly embedded at a predetermined location therein, comprising: a form having a skin portion defining the shape of the structural member; a connecting plate associated with said skin portion having an outer end pivotal about a substantially horizontal axis and an inner end having a down position immediately above said predetermined location within said skin portion and an up position exterior of said skin portion; said outer end of said connecting plate being spaced exterior of said skin portion such that when said inner end of said connecting plate is in said up position removal of the precast member from said form is not impaired by said connecting plate; and means associated with said outer end of said connecting plate for releasably securing said weld plate and anchoring assembly to said connecting plate such that when said connecting plate is in its down position said weld plate and anchoring assembly is positioned within said skin portion and when said connecting plate is moved to said up position said weld plate and anchoring rod assembly remain embedded within said precast structural member.

2. The invention as defined in claim 1 further including: a spacing member having a first end secured to said skin portion and a second end spaced exterior therefrom; and a butt hinge having first and second hinge plates pivotally connected about a substantially horizontal axis, said first hinge plate being secured to said connecting plate and said second hinge plate being secured to the second end of said spacer plate.

3. The invention as defined in claim 2 including a stiffener plate secured to said skin portion and said spacer member.

4. The invention as defined in claim 1 wherein said weld plate and anchoring rod assembly is secured to said connecting plate with a double backed adhesive tape so as to permit said connecting plate to move to said up position with said weld plate and anchoring rod assembly remaining embedded within said precast structural member.

5. The invention as defined in claim 1 wherein said weld plate and anchoring rod assembly is glued to said connecting plate so as to permit said connecting plate to move to said up position with said weld plate and anchoring rod assembly remaining embedded within said precast structural member.

* * * * *